Patented Jan. 5, 1954

2,665,279

UNITED STATES PATENT OFFICE 2,665,279

HETEROCYCLIC ANTITUBERCULOUS COMPOUNDS

John Alfred Aeschlimann, Montclair, and Arthur Stempel, River Edge, N. J., assignors to Hoffmann-La Roche Inc., Nutley, N. J., a corporation of New Jersey No Drawing. Application July 2, 1952,
Serial No. 296,948

6 Claims. (Cl. 260—295)

This invention relates to novel chemical compounds. More particularly the invention is concerned with compounds selected from the class consisting of 5-(4-pyridyl)-1,3,4-oxadiazol-2(3H)-one and 3-lower alkyl-5-(4-pyridyl)-1,3,4-oxadiazol-2(3H)-one. This class can be represented by the formula

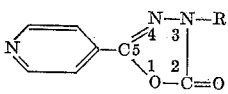

wherein R is hydrogen or a lower alkyl radical. The members of this class are antituberculous compounds, and are also useful as intermediates in the preparation of derivatives having utility as medicinals.

In general, the members of the above class can be made by reacting 1-isonicotinyl hydrazine or a 1-isonicotinyl-2-lower alkyl-hydrazine with phosgene, and neutralizing the reaction mixture thus obtained.

The invention is further disclosed in the following examples, which are illustrative but not limitative thereof:

Example 1

To a stirred suspension of 10 g. of monosodium urea in 15 cc. of acetone, 25 cc. of methyl isonicotinate were added. The temperature rose rapidly to about 40° C. An additional 10 cc. of acetone were added. The thick mixture was kept overnight at room temperature, filtered and washed with acetone. After dissolving the washed material in 250 cc. of water, the pH of the solution was 11.5. When neutralized to pH 5–6 with acetic acid, isonicotinyl urea crystallized, M. P. 233°–236° C. with decomposition. After two recrystallizations from water, the melting point rose to 240°–241° C. with decomposition.

A solution of 4 g. of isonicotinyl urea in 110 cc. of concentrated hydrochloric acid was cooled in an ice bath and a rapid stream of chlorine was passed through for 15 minutes. The solution was diluted with 500 cc. of water, cooled and neutralized with sodium carbonate. The chlorine-containing product that separated was filtered and dried in a vacuum desiccator. A solution of 3.1 g. of the chlorine-containing compound in 50 cc. of 5% NaOH was made and, after several minutes at room temperature, was neutralized with acetic acid. The solid that separated was filtered off and recrystallized from water to give 5-(4-pyridyl)-1,3,4-oxadiazol-2(3H)-one, M. P. 268°–270° C. The formation of this product can be represented by the following formula scheme, in which the product in square brackets is a hypothetical intermediate:

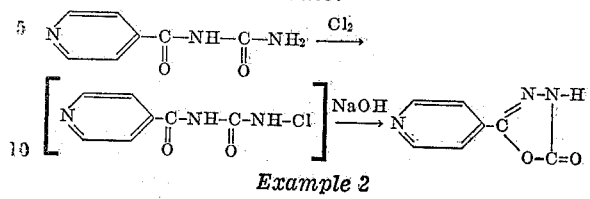

Example 2

A solution of 10 g. of isonicotinyl hydrazine in 100 cc. of water was cooled in an ice bath and a stream of phosgene was passed through for 15 minutes. The solution was then diluted, neutralized with sodium carbonate and filtered. The crude 5-(4-pyridyl)-1,3,4-oxadiazol-2(3H)-one, melting at 270°–272° C. with decomposition, was recrystallized from water or alcohol without significant change in melting point. A mixed melting point with the product prepared in Example 1 showed no depression. The product of this example is formed according to the following formula scheme:

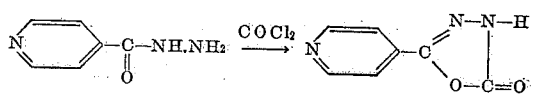

Example 3

A solution of 10 g. of 1-isonicotinyl-2-isopropyl hydrazine (prepared by reacting isonicotinic acid hydrazide with acetone to produce 1-isonicotinyl-2-isopropylidene-hydrazine, and catalytically hydrogenating the latter) in 150 cc. of water was cooled to 5° C. and a stream of phosgene was passed through for 10 minutes. After neutralization with sodium carbonate, the product, 3-isopropyl-5-(4-pyridyl)-1,3,4-oxadiazol-2(3H)-one, crystallized, M. P. 126°–131° C. After recrystallization from dilute aqueous acetone, the product melted at 127°–129° C. The formation of this product can be illustrated by the following formula scheme:

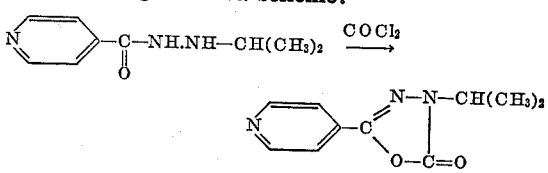

Similarly, by using other species of 1-isonicotinyl-2-lower alkyl-hydrazine as the starting materials in lieu of 1-isonicotinyl-2-isopropyl hydrazine recited above, additional species of 3-lower alkyl-5-(4-pyridyl)-1,3,4-oxadiazol-2(3H)-one can be prepared, which latter have the same lower alkyl radical in the 3-position thereof as present in the 2-position of the substituted hydrazine starting material.

The 1-isonicotinyl-2-lower alkyl-hydrazine starting materials employed in this example are not part of the instant invention. In general, starting materials of this class can be prepared by reacting 1-isonicotinyl hydrazine with a dialkyl ketone to yield a 1-isonicotinyl-2-lower alkylidene-hydrazine and catalytically hydrogenating the latter to produce a 1-isonicotinyl-2-lower alkyl-hydrazine. An alternative method of preparation comprises reacting a lower alkyl ester of isonicotinic acid with a lower alkyl hydrazine, the lower alkyl substituent in which latter is the same as that of the desired 1-isonicotinyl-2-lower alkyl-hydrazine.

*Example 4*

A mixture of 1 g. of 5-(4-pyridyl)-1,3,4-oxadiazol-2(3H)-one and 4 cc. of aniline was heated to boiling for 3-4 minutes. After cooling, the reaction product, containing isonicotinic acid hydrazide, was slurried in ether and extracted with water. On addition of levulinic acid to the aqueous layer, γ-isonicotinyl hydrazonovaleric acid crystallized, M. P. 208°-209° C. (The last named compound is not part of our invention.)

The reaction can be illustrated by the following formula scheme, in which R represents the radical attached to the amino group. In the immediately preceding paragraph, R represents phenyl. In the three paragraphs immediately following this formula scheme, R represents respectively, cyclohexyl, 2-ethylhexyl, and diethylaminoethyl.

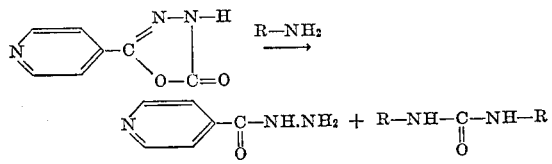

A mixture of 1 g. of 5-(4-pyridyl)-1,3,4-oxadiazol-2(3H)-one and 5 cc. of cyclohexylamine was refluxed for 15 minutes. After cooling, the slurry produced, containing isonicotinic acid hydrazide, was partitioned between water and ether. The aqueous layer reacted with levulinic acid to give γ-isonicotinyl hydrazonovaleric acid, M. P. 203°-205° C. Recrystallization from ethanol raised the melting point to 208°-210° C.

Following the procedure of the preceding paragraph, a mixture of 2 g. of 5-(4-pyridyl)-1,3,4-oxadiazol-2(3H)-one and 20 cc. of 2-ethylhexylamine refluxed for 2 hours yielded γ-isonicotinyl hydrazonovaleric acid, M. P. 203°-204° C. Recrystallization from ethanol raised the melting point to 206°-208° C.

A solution of 2 g. of 5-(4-pyridyl)-1,3,4-oxadiazol-2(3H)-one in 20 cc. of diethylaminoethylamine was refluxed for 1 hour. After excess diethylaminoethylamine was distilled off in vacuo, the residue crystallized. Recrystallization from acetonitrile gave 750 mg. of isonicotinic acid hydrazide, M. P. 160°-165° C. Further recrystallization brought the melting point to 166°-168° C. On reaction with levulinic acid the hydrazide gave γ-isonicotinyl hydrazonovaleric acid, M. P. 210°-212° C.

*Example 5*

A mixture of 3 g. of 5-(4-pyridyl)-1,3,4-oxadiazol-2(3H)-one in 50 cc. of methanol containing 1.5 cc. of hydrazine was refluxed for 1 hour. The product, 1-isonicotinyl-carbohydrazide, crystallized from the hot solution, M. P. 215°-216° C. This product, which can be represented by the formula

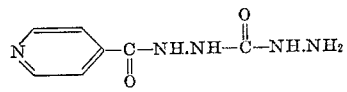

is also an antituberculous compound.

The formation of the above product can be represented by the following formula scheme:

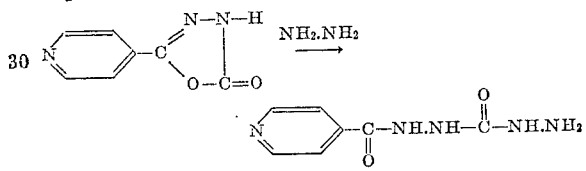

We claim:
1. A compound selected from the class consisting of 5-(4-pyridyl)-1,3,4-oxadiazol-2(3H)-one and 3-lower alkyl-5-(4-pyridyl)-1,3,4-oxadiazol-2(3H)-one.
2. 5-(4-pyridyl)-1,3,4-oxadiazol-2(3H)-one.
3. 3-lower alkyl-5-(4-pyridyl)-1,3,4-oxadiazol-2(3H)-one.
4. 3-isopropyl-5-(4-pyridyl)-1,3,4-oxadiazol-2(3H)-one.
5. 1-isonicotinyl-carbohydrazide.
6. A process of preparing isonicotinic acid hydrazide which comprises reacting 5-(4-pyridyl)-1,3,4-oxadiazol-2(3H)-one with a primary amine, at a reaction temperature above about 130° C.

JOHN ALFRED AESCHLIMANN.
ARTHUR STEMPEL.

References Cited in the file of this patent
FOREIGN PATENTS

| Number | Country | Date |
| --- | --- | --- |
| 730,292 | Germany | Jan. 14, 1943 |

OTHER REFERENCES

Chem. Berichte, vol. 82, pp. 260-3 (1949).
Chem. Abstracts, vol. 25, col. 3633 and 3634.